United States Patent [19]

Trauben et al.

[11] Patent Number: 5,509,130
[45] Date of Patent: Apr. 16, 1996

[54] METHOD AND APPARATUS FOR GROUPING MULTIPLE INSTRUCTIONS, ISSUING GROUPED INSTRUCTIONS SIMULTANEOUSLY, AND EXECUTING GROUPED INSTRUCTIONS IN A PIPELINED PROCESSOR

[75] Inventors: Richard D. Trauben, Morgan Hill; Sunil Nanda, Los Altos, both of Calif.

[73] Assignee: Sun Microsystems, Inc., Mountain View, Calif.

[21] Appl. No.: 355,804

[22] Filed: Dec. 14, 1994

Related U.S. Application Data

[63] Continuation of Ser. No. 875,353, Apr. 29, 1992, abandoned.
[51] Int. Cl.$^6$ ........................................ G06F 9/38
[52] U.S. Cl. .................... 395/375; 395/800; 364/DIG. 1
[58] Field of Search ..................... 395/375, 800

[56] References Cited

U.S. PATENT DOCUMENTS

| | | | |
|---|---|---|---|
| 5,129,067 | 7/1992 | Johnson | 395/375 |
| 5,136,697 | 8/1992 | Johnson | 395/375 |
| 5,226,126 | 7/1993 | McFarland et al. | 395/375 |
| 5,226,130 | 7/1993 | Favor et al. | 395/375 |
| 5,230,068 | 7/1993 | Van Dyke et al. | 395/375 |

OTHER PUBLICATIONS

*Machine organization of the IBM RISC System/6000 processor*, Author: G. F. Grohoski; Publication: IBM Journal of Research & Development, vol. 34 No. 1, Jan. 1990.
*A High Speed Superscalar PA-RISC 7100 Processor*, Authors: Eric DeLano, Will Walker, Jeff Yetter, Mark Forsyth; Publication: Digest of Papers Compcon, Spring 1992.
*The Motorola 88110 Superscalar RISC Microprocessor*, Authors: Keith Diefendorff & Michael Allen; Publication: Digest of Papers Compcon, Spring 1992.
Abu–Nofal et al., "A Three–Million–Transistor Microprocessor," *1992 IEEE Solid–State Circuits Conference. Digest of Technical Papers*, Feb. 19–21, 1992, pp. 108–109.
Kohn et al., "Introducing the Intel i860 64–Bit Microprocessor," *IEEE Micro*, Aug. 1989, pp. 15–30.
Lightner et al., "The Metaflow Lightning Chipset," Compcon Spring '91, IEEE, Conference Paper, Feb. 25–Mar. 1, 1991, pp. 13–18.
Popescu et al., "the Metaflow Architecture," *IEEE Micro*, Jun. 1991, pp. 10–13 and 63–73.
David J. Lilja, "Reducing the Branch Penalty in Piplined Processors," *Computer*, IEEE, Jul. 1988, pp. 47–55.
Smith et al., "Implementing Precise Interrupts in Piplined Processors," *IEEE Transactions on Computers*, vol. 37, No. 5, May 1988, pp. 562–573.

*Primary Examiner*—William M. Treat
*Attorney, Agent, or Firm*—Blakely Sokoloff Taylor & Zafman

[57] ABSTRACT

In a pipelined processor, an instruction queue and an instruction control unit is provided to group and issue m instructions simultaneously per clock cycle for execution. An integer and a floating point function unit capable of generating $n_1$ and $n_2$ integer and floating point results per clock cycle respectively, where $n_1$ and $n_2$ are sufficiently large to support m instructions being issued per clock cycle, is also provided to complement the instruction queue and instruction control unit. The pipeline stages are divided into integer and floating point pipeline stages where the early floating point stages overlap with the later integer pipeline stages. The instruction queue stores sequential instructions of a program and target instructions of a branch instruction of the program, fetched from the instruction cache. The instruction control unit decodes the instructions, detects operands cascading from instruction to instruction, group instructions into instruction groups of at most m instructions applying a number of exclusion rules, and issuing the grouped instructions simultaneously to the integer and/or floating point unit for execution. The exclusion rules reflect the resource characteristics and the particular implementation of the pipelined processor. The instruction control unit also tracks the history of the instruction groups and uses the history in conjunction with the exclusion rules in forming the instruction groups.

12 Claims, 12 Drawing Sheets

LINPACK Daxpy_4
A(i) = N • B(j) + C(k)    (unrolled 4X) ⎫
                                          ⎬ ←—170
                                          ⎭

// p = N x B(j);

```
loop:      inc    32,%i0
       ⎧   ldd    [%i1],%f6
    172⎨   fmuld  %f30,%f6,%f6
       ⎩   ----
       ⎧   ldd    [%i1+8],%f14
    174⎨   fmuld  %f30,%f14,%f14
       ⎩   ----
       ⎧   ldd    [%i1+16],%f22
    176⎨   fmuld  %f30,%f22,%f22
       ⎩   inc    -4,%i5
       ⎧   add    %i5,-3,%i1
    178⎨   ldd    [%i1+24],%f0
       ⎩   fmuld  %f30,%f0,%f0
           ----
```

// s = p + C(k);

```
       ⎧   tst    %i1
    180⎨   ldd    [%i2],%f10
       ⎩   faddd  %f10,%f6,%f6
           ----
       ⎧   ldd    [%i2+8],%f18
    182⎨   faddd  %f18,%f14,%f18
       ⎩   inc    32,%i1
       ⎧   ldd    [%i2+16],%f26
    184⎨   faddd  %f26,%f22,%f26
       ⎩   ----
       ⎧   ldd    [%i2+24],%f4
    186⎨   faddd  %f4,%f0,%f4
       ⎩   ----
```

// A(i) = s;

```
       ⎧   std    %f10,[%i0+8]
    188⎨   inc    32,%i2
       ⎩   ----
    190⎧   std    %f18,[%i0+8]
       ⎩   ----
       ⎧   std    %f26,[%i0+16]
    192⎨   bge    loop
       ⎩   ----
    194⎧   std    %f4,[%i0+24]
       ⎩   ----
```

$$\text{IPC} = \frac{27 \text{ Instructions}}{12 \text{ Cycles}} = 2.25$$

FIG. 11

METHOD AND APPARATUS FOR GROUPING MULTIPLE INSTRUCTIONS, ISSUING GROUPED INSTRUCTIONS SIMULTANEOUSLY, AND EXECUTING GROUPED INSTRUCTIONS IN A PIPELINED PROCESSOR

This is a continuation of application Ser. No. 07/875,353 filed Apr. 29, 1992 now abandoned.

BACKGROUND OF THE INVENTION

1. Field of the Invention

The present invention relates to the field of computer systems, in particular, computer systems having pipelined processors. More specifically, the present invention relates to grouping multiple instructions, issuing them at the same time, and executing them in a pipelined processor.

2. Background

The execution time required for a given computer program is the product of three factors: the dynamic assembly language instruction count of the program, the number of cycles per instruction, and the basic clock rate of the processor. The first factor is determined by compiler technology in reducing the total dynamic instruction count for the program of interest. The last factor is determined by the speed limits of integrated circuit fabrication technology in creating low capacitance interconnect between fast transistors. The second factor is determined by the architecture of the processor, in particular, the architecture for instruction issuance and execution, which is the focus of the present invention, Today, to improve execution performance, many computer systems offer pipelined processors. Pipelining is a processor implementation technique whereby multiple instructions are simultaneously overlapped in execution. Pipelining increases the processor instruction execution throughput, that is the rate of instructions exiting the pipeline, notwithstanding the slight increase in the execution time of an individual instruction due to the added pipeline control.

A pipelined processor is analogous to an assembly line having multiple stages with each pipe stage completing a part of an instruction being executed. Typically, the pipeline can be broken down into six stages, instruction fetching, instruction decoding, data memory addresses generation, processor resident operand fetching, instruction execution, and results writing. Multiple instructions are moved through the pipe stages in an overlapping manner.

Traditionally, all pipe stages must be ready and proceed at the same time. As a result, the machine cycle, the time required to move an instruction one step down the pipeline, and therefore the throughput of a pipelined processor was determined and limited by the slowest pipe stage. Thus, beside the obvious approach of using faster pipe stages, many modern pipelined processors are designed to allow the function units to proceed independently at their own pace.

However, by allowing the function units to proceed independently at their own pace, various pipeline hazards are introduced. When encountered, the executing and subsequent instructions will have to stalled. There are three classes of pipeline hazards:

1. Structural hazards due to resource conflicts when the processor is not fully pipelined to support all possible combinations of instructions in simultaneous overlapped execution, e.g. two simultaneous register writes on a pipelined processor having only one register file write port;

2. Data hazards due to an instruction's dependency on the result of an earlier instruction which is not yet available, e.g. a subsequent ADD instruction depending on the result of an earlier SUBTRACT instruction which is not yet available; and 3. Control hazards due to pipelining of branches and other instructions that change the program counter.

Thus, modern pipelined processors are typically optimized to reduce the likelihood of pipeline hazard occurrence. Additionally, one of various synchronization approaches is employed to deal with pipeline hazards. Particular examples of synchronization approaches include:

1) Forwarding or By-passing, which is a simple hardware technique where the arithmetic logic unit (ALU) result is always fed back to the ALU input latches. If an earlier ALU operation has written to the register corresponding to a source for the current ALU operation, the forwarded result is selected as the ALU input instead of the value read from the register file.

2) Scoreboard, which is a more sophisticated hardware technique, where centralized information are maintained to facilitate dynamic schedule around data hazards, that is to allow out of order execution of instructions with sufficient resources and no data dependencies. Typically, the scoreboard includes an instruction status table that tracks the current status of each issued or pending instruction, a function unit status table that tracks the current status of each function unit, and a register result status table that tracks which function unit will write to a register.

3) The Tomasulo algorithm, which is a decentralized variant of the scoreboard approach, but differs in two significant ways;

a. Hazard detection and execution control are distributed to function units by the use of reservation stations in the function units where dispatched instructions are queued for execution pending resolution of all dependencies and availability of the function units;

b. Execution results are passed directly from the function units rather than going through the registers.

Traditionally, instructions were variable in length and they were fetched and dispatched into the pipeline one at a time. Instructions were made variable in length because a high premium was placed on efficient compaction of instructions in memory due to the relative high cost of memory. As a result, the instruction decoding stage required a lot of speculative hardware. The instructions were decoded sequentially, because until the first instruction was decoded, the starting byte position of the next instruction could not be determined. Furthermore, each instruction took multiple clock cycles to decode.

However, since the cost of memory has become relatively inexpensive, many modern pipelined processors, particularly reduced instruction set based pipelined processors, now offer fixed length instructions. As a result, the instruction decoding stage no longer requires a lot of speculative hardware. Multiple instructions may be decoded at the same time, since the starting position of each instruction is determinable. Furthermore, with sufficient resources, multiple instructions may be decoded in one clock cycle.

Thus, fixed length instructions offer a new opportunity to increase the execution rate, and therefore the throughput of pipelined processors. It is therefore desirable to be able to fetch, decode and issue multiple instructions to independent function units in one clock cycle. Furthermore, it is particularly desirable if the multiple instructions are issued with minimum increase in hardware for either centralized or decentralized synchronization.

As will be obvious from the disclosure to follow, these objects and desired results are among the objects and desired results of the present invention, which provides a new approach to allow multiple instructions to be fetched, decoded and issued at the same time, thereby increasing the execution rate and throughput of a pipelined processor.

For further description of pipelining, see J. L. Hennessy and D. A. Patterson, *Computer Architecture A Quantitative Approach*, Morgan Kaufmann Publishers, Inc., 1990.

SUMMARY OF THE INVENTION

A method and apparatus for grouping multiple instructions, issuing them at the same time, and executing them in a pipelined processor is being disclosed. Under the presently preferred embodiment, an instruction queue and an instruction control unit is provided to a pipelined processor for grouping and issuing up to m instructions per clock cycle simultaneously for overlapped execution. Additionally, the pipeline processor is also provided with an integer unit and a floating point unit capable of generating up to $n_1$ and $n_2$ integer and floating point results per clock cycle respectively, where $n_1$ and $n_2$ are sufficiently large to support m instructions being issued per clock cycle, to complement the instruction queue and the instruction control unit. The integer unit and the floating point unit are provided with their own integer and floating point register file respectively. The floating point unit is also provided with a floating point operation queue and a floating point operation control unit. Furthermore, the pipeline stages of the processor are divided into integer pipeline stages and floating point pipeline stages, with the earlier floating point pipeline stages overlapping the later integer pipeline stages.

In its presently preferred form, the instruction queue comprises a sequential queue and a target queue, for storing sequential instructions of a program and target instructions of a branch instruction of the program respectively, fetched from the instruction cache.

In its presently preferred form, the instruction control unit comprises a prefetch controller and a scheduler. The prefetch controller controls instruction prefetching, including branch path prediction and resolution. The scheduler comprises an opcode decoder, a cascade detector, grouping logic and prior group history. The opcode decoder decodes the instructions. The cascade detector detects cascading of operands from instruction to instruction. The prior group history tracks the instruction group issued. The grouping logic groups the instructions into instruction group of at most m instructions based on the inputs received from the opcode decoder and the cascade detector, the history maintained by the prior group history, and the application of a number of "Break After" and "Break Before" exclusion rules. The "Break After" and "Break Before" exclusion rules reflect resource characteristics and the particular implementation of the processor. The grouped instructions are issued simultaneously to the integer and floating units for overlapping execution.

In one embodiment, the integer unit comprises a number of adders and at least one shifter, functioning cooperatively as $n_1$ logical adders. At least one of the adder is an address adder, and at least two of the adders also perform boolean operations.

The integer pipeline stages comprise a number of instruction fetch stages, a number of instruction decode stages, a number of execution stages and at least one write back stage. The floating point pipeline stages comprise a number of decode stages, a number of execution stages, and at least one write back stage. The floating point instruction decode stages overlap with the later integer execution and write back stages.

At the integer instruction fetch stages, instructions are pre-fetched from the instruction cache to the appropriate instruction queues under the control of the prefetch controller of the instruction control unit. At the integer instruction decode stages, the appropriate instructions are decoded, grouped into instruction groups of at most m instructions, and issued simultaneously for overlapped execution by the scheduler of the instruction control unit. Furthermore, at the integer instruction decode stages, data are read from the registers, target and load/store addresses are computed by the integer unit. At the integer execution stages, data are read from the data cache, integer operations are performed, and data are loaded from memory by the integer unit. Furthermore, at the integer execution stages, floating point operations are issued and exceptions are resolved by the instruction control unit. At the integer write back stage(s), the integer results are written back by the integer unit.

At the floating point instruction decode stages, floating point instructions are decoded by the floating point operation control unit and data are read from the registers by the floating point unit. At the floating point execution stages, floating point operations are performed by the floating point unit. Finally, at the floating point write back stage(s), data are written back by the floating point unit.

All branch instructions are predicted to be taken by the prefetch controller of the instruction control unit. In each case, the target instructions are caused to be prefetched by the prefetch controller before the branch direction is determined by the integer unit. The next sequential instruction is grouped with a delayed instruction and speculatively issued by the scheduler of the instruction control unit. If indeed a branch instruction is taken, the speculatively issued sequential instruction is squashed by the integer unit, when the branch is resolved. If the branch is not taken, the prefetched target instructions are discarded and the sequential instructions are decoded and issued instead by the scheduler, when the branch is resolved.

BRIEF DESCRIPTION OF THE DRAWINGS

The objects, features, and advantages of the present invention will be apparent from the following detailed description of the preferred embodiment of the invention with references to the drawings in which:

FIG. 11 illustrates the execution of an exemplary application on the pipelined processor of FIG. 1.

DETAILED DESCRIPTION PRESENTLY PREFERRED AND ALTERNATE EMBODIMENTS

A method and apparatus for grouping multiple instructions and issuing them simultaneously for execution in a pipelined processor with independent function units is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
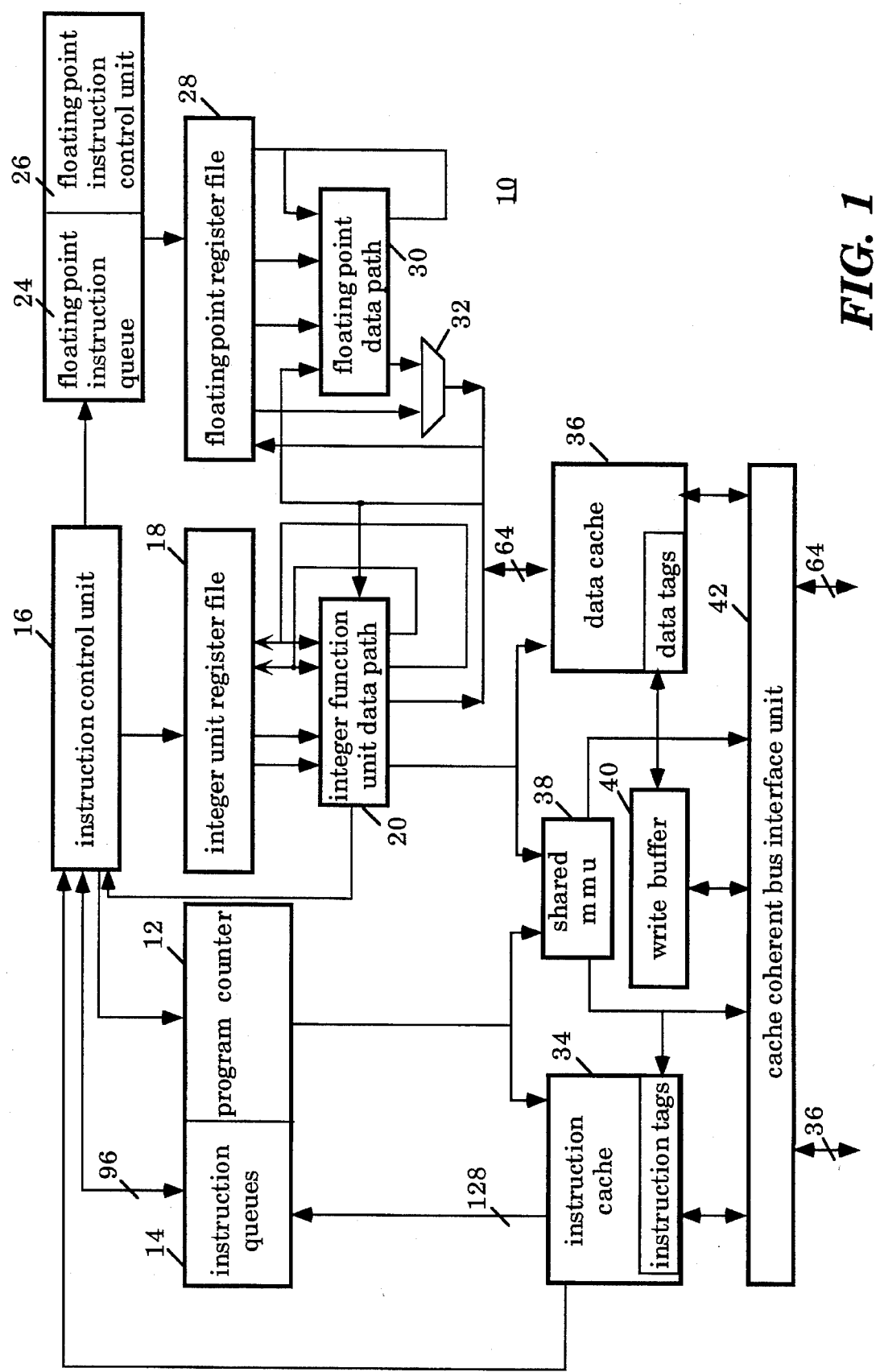
FIG. 1 shows a functional block diagram of a pipelined processor incorporating the teachings of the present invention.

Referring now to FIG. 1, a functional block diagram illustrating an exemplary pipelined processor incorporating the teachings of the present invention is shown. Shown is an exemplary pipelined processor 10 comprising a program counter 12, a number of instruction queues 14 and an instruction control unit 16. The program counter 12, the instruction queues 14, and the instruction control unit 16 are coupled to each other. Together, they cooperate to issue at most three instructions simultaneously per clock cycle.

Except for the manner in which the program counter 12 cooperates with the instruction control unit 16, it is intended to represent a broad category of program counters found in most pipelined processors. Its basic functions and constitutions are well known and will not be described further. The instruction queues 14, the instruction control unit 16 and the manner in which they cooperate with each other, and the program counter 12 will be described in further detail later with references to FIGS. 3–9.

While, for ease of understanding the present invention, the present invention is being described with the exemplary processor 10 whose program counter 12, instruction queues 14 and instruction control unit 16 cooperate to issue at most three instruction simultaneously per clock cycle, based on the description to follow, it will be appreciated that alternatively the present invention may be practiced with these elements cooperating to issue at most m instructions simultaneously per clock cycle, provided all other complementary design considerations are adjusted accordingly. It will further be appreciated that the choice of m, for m being relatively small, is a tradeoff between further increases in execution performance gain versus further increases in the time required to determine an instruction group and implementation complexity. However, the time required to determine an instruction group, and the implementation complexity will increase in a non-linear manner as m increases; and at some point, the time required to determine an instruction group and/or the implementation complexity will outweigh the savings in instruction execution time.

Continuing to refer to FIG. 1, the pipelined processor 10 further comprises an integer unit register file 18, and an integer function unit 20. The integer unit register file 18 is coupled to the instruction control unit 16, and the integer function unit 20, which in turn is coupled to the instruction control unit 16. The integer unit register file 18 and the integer function unit 20, cooperate to generate at most two integer results per clock cycle.

The integer unit register file 18 comprises four independent register ports. The four independent register ports, when time multiplexed, provide the equivalent capacity of six read and two write ports, sufficient to support either concurrent reading of two address registers, or concurrent reading of four data registers or concurrent writing of any two registers. Except for the read/write bandwidth of the integer unit register file 18, and the manner in which the integer unit register file 18 cooperates with the integer function unit 20, the integer unit register file 18 is intended to represent a broad category of register files found in most pipelined processors. Its basic functions and constitutions are well known and will not be described further. One embodiment of the integer function unit 20, and the manner in which the integer function unit 20 cooperates with the instruction control unit 16 and the integer unit register file 18 will be described in further detail later with references to FIGS. 2, 8–9.

While, for ease of understanding the present invention, the present invention is being described with the exemplary processor 10, whose integer unit register file 18 and integer function unit 20 cooperate to generate at most two integer results per clock cycle, based on the description to follow, it will be appreciated that alternatively the present invention may be practiced with these elements cooperating to generate at most $n_1$ integer results per clock cycle, provided all other complementary design considerations, in particular, the integer function unit 20, are adjusted accordingly.

Still referring to FIG. 1, the exemplary pipelined processor 10 further comprises a floating point instruction queue 24, a floating point instruction control unit 26, a floating point unit register file 28, a floating point function unit 30, and a multiplexor 32. The floating point instruction queue 24 is coupled to the instruction control unit 16 and the floating point instruction control unit 26, which in turn is coupled to the floating point unit register file 28. The floating point unit register file 28 is also coupled to the floating point function unit 30, and the multiplexor 32. Together, they generate at most one floating point result per clock cycle.

Except for the manner in which the floating point instruction queue cooperates with the instruction control unit 16, the floating point instruction queue 24, the floating point instruction control unit 26, the floating point unit register file 28, the floating point unit 30, and the multiplexor 32 are intended to represent a broad category of these elements found in most pipelined processors. Their basic functions and constitutions are well known and will not be described further. The manner in which the floating point instruction queue 24 cooperates with the instruction control unit 16 will be described in further detail later with references to FIGS. 8–9.

While, for ease of understanding the present invention, the present invention is being described with the exemplary processor 10, whose floating point instruction queue 24, floating point instruction control 26, floating point unit register file 28, floating point function unit 30 and multiplexor 32 cooperate to generate at most one floating point result per clock cycle, based on the description to follow, it will be appreciated that alternatively the present invention may be practiced with these elements cooperating to generate at most $n_2$ floating point results per clock cycle, provided all other complementary design considerations, in particular, the floating point instruction queue 24, the floating point instruction control unit 26 and the floating point function unit 30, are adjusted accordingly.

Still referring to FIG. 1, the exemplary pipelined processor 10 further comprises an instruction cache 34, a data cache 36, a shared memory management unit 38, a write buffer 40, and a cache coherent bus interface unit 42. The instruction cache 34 is coupled to the program counter 12, instruction queues 14, the instruction control unit 16, the shared memory management unit 36, and the cache coherent bus interface unit 42. The data cache 36 is coupled to the integer function unit 20, the floating point unit register file 28, the multiplexor 32, the shared memory management unit 38, the write buffer 40, and the cache coherent bus interface unit 42. The shared memory management unit 38 and the write buffer 40 are in turn also coupled to the cache coherent bus interface unit 42. Together, they cooperate to provide instructions to the instruction queues 14, and data to the integer/floating function unit, 20 and 30, and their register files, 18 and 28.

Except for the manner in which the instruction cache 34 cooperates with the instruction queues 14, the instruction control unit 16, and the manner in which the data cache 36 cooperates with the integer function unit 20, the instruction cache 34, the data cache 36, the shared memory management unit 38, the write buffer 40, and the cache coherent bus interface unit 42 are intended to represent a broad category of these elements found in most pipelined processors. Their basic functions and constitutions are well known and will not be described further. The manner in which the instruction cache 34 cooperates with the instruction queues 14, the instruction control unit 16, and the manner in which the data cache 36 cooperates with the integer function unit 20 will be described in further detail later with references to FIGS. 3, 8 and 9.

Figure 2:
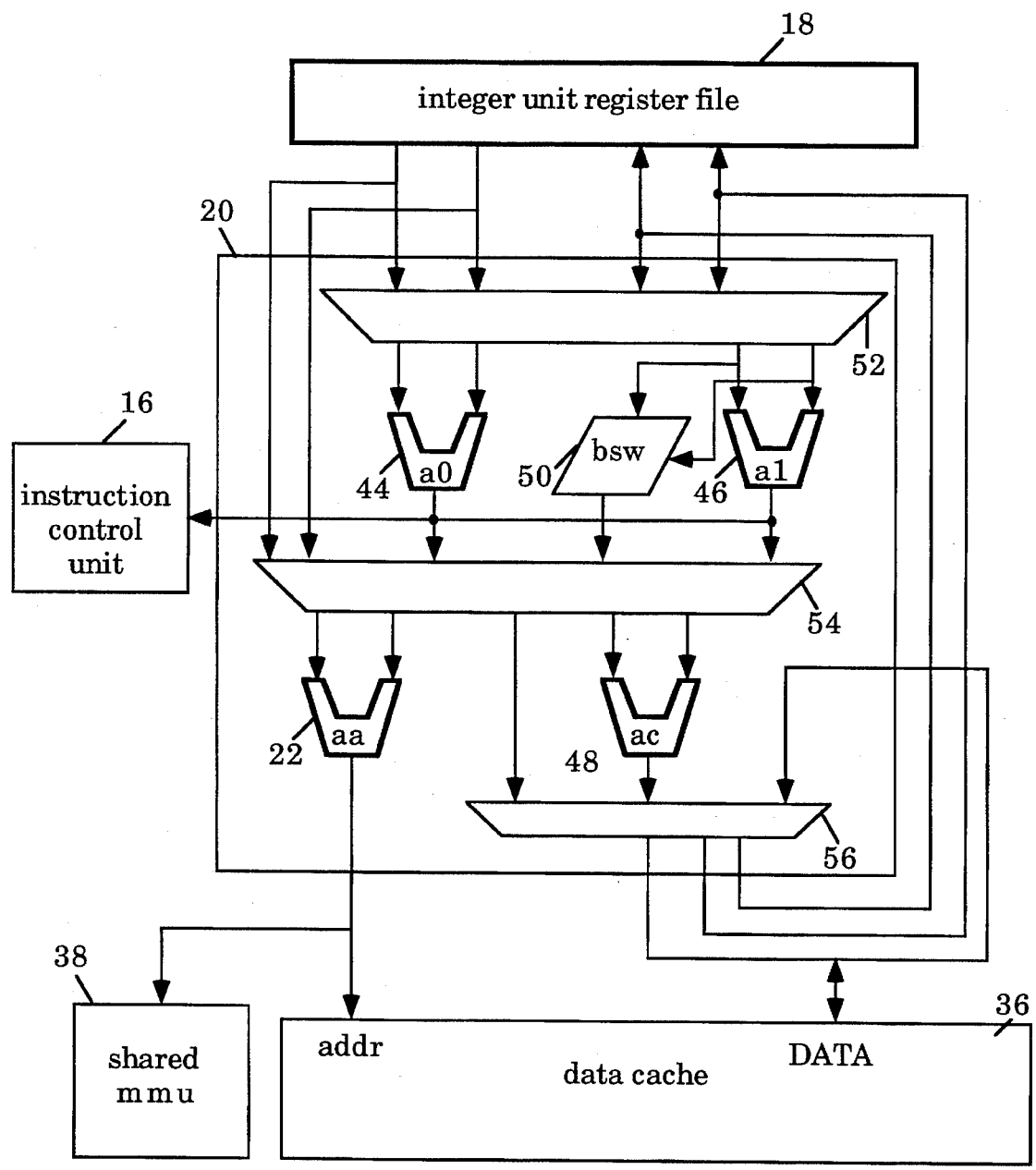
FIG. 2 shows a functional block diagram of one embodiment of the integer function unit of the pipelined processor of FIG. 1.

Referring now to FIG. 2, a functional block diagram illustrating one embodiment of the integer function unit of the exemplary pipelined processor of FIG. 1 is shown. Shown is the integer function unit 20 comprising an address adder 22, three data adders, 44, 46 and 48, a shifter 50, and three multiplexors 52, 54 and 56. Together, they cooperate to generate at most two integer results per clock cycle.

The address adder 22 is coupled to the second multiplexor 54, the data cache 36, and the shared memory management unit 38; the second multiplexor 54 in turn is coupled to the integer unit register file 18. The first and second data adders, 44 and 46, and the shifter 50, are coupled to the first and second multiplexors, 52 and 54; the first multiplexor in turn is coupled to the integer unit register file 18. The third data adder 48 is coupled to the second and third multiplexors, 54 and 56; the third multiplexor in turn is coupled to the data cache 36. Additionally, the first and second data adders, 44 and 46, are coupled to the instruction control unit 16.

The address adder 22 generates addresses. The address adder 22 receives addresses from the integer unit register file 18 as inputs through the second multiplexor 54, and outputs addresses to the data cache 36 and the shared memory management unit 38, The three data adders, 44, 46 and 48, and the shifter 50, together function as two logical adder resources to compute integer function unit results. The first and second adders, 44 and 46, are also capable of performing boolean operations. The first data adder 44 receives data from the integer unit register file 18 as inputs through the first multiplexor 52, and outputs data to the program counter 12 or the second multiplexor 54, which in turn is selectively provided to the third data adder 48 and/or the third multiplexor 56. The data provided to the third multiplexor 56 are in turn selectively provided to the data cache 36 and/or forwarded for the next instruction. The second data adder 46 and the shifter 50 receive data from the integer unit register file 18, or data from the data cache 36 or forwarded data as inputs through the first multiplexor 52, and output condition codes or data to the instruction control unit 16 or the second multiplexor 54, which in turn is selectively provided to the third data adder 48 and/or the third multiplexor 56. Similarly, the data provided to the third multiplexor 56 are in turn selectively provided to the data cache 36 and/or forwarded for the next instruction.

The adders, 22, 44–48 and the shifter 50, are capable of receiving up to two address register and four data register operands per clock cycle. Each of the adders 22, 44–48, as well as the shifter 50, take only half a clock cycle to complete its operation.

While for ease of understanding, the integer function unit 20 has been described with the above embodiment comprising two logical adders cooperatively generating at most two, integer results per clock cycle, it will be appreciated that the above embodiment may be extended to comprise $n_1$ logical adders cooperatively generating at most $n_1$ integer results per clock cycle, where $n_1$ is greater than two. Additionally, while the integer function unit 20 has been described with the above embodiment, it will be appreciated that the present invention may be practiced with other embodiments that generate sufficient complementary number of integer results per clock cycle.

Figure 3:
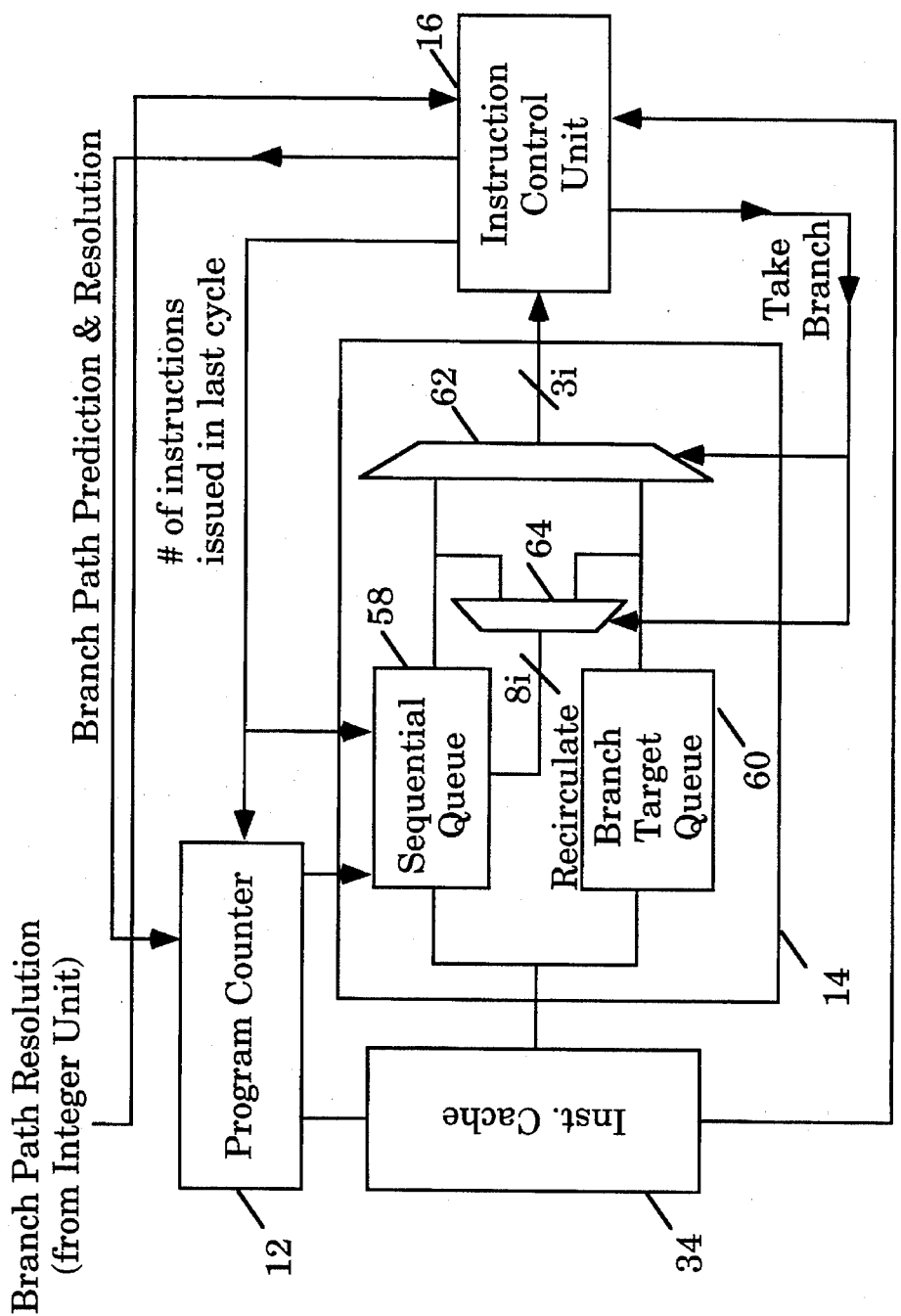
FIG. 3 shows a functional block diagram of the presently preferred embodiment of the instruction queue of the present invention incorporated in the pipelined processor of FIG. 1.

Referring now to FIG. 3, a function block diagram illustrating the instruction queue of the exemplary pipelined processor of FIG. 1 is shown. Shown is the instruction queues 14 comprising a sequential queue 58, a branch target queue 60, and two multiplexors 62 and 64. Together, they cooperate to provide the instruction control unit 16 with three instructions per clock cycle.

The sequential and branch target queues, 58 and 60, are coupled to the instruction cache 34, and the two multiplexors 62 and 64. Additionally, the sequential queue 58, the first multiplexor 62, and the second multiplexor 64 are also coupled to the instruction control unit 16. The sequential queue 58 is also coupled to the program counter 12.

The sequential and branch target queues, 58 and 60, generate candidate instructions for the instruction control unit 16. The sequential queue 58 receives instructions from the instruction cache 34, the number of instructions issued in the last cycle from the instruction control unit 16, and a branch path selection signal from the program counter 12 as inputs, and outputs instructions to both multiplexors 62 and 64. Similarly, the branch target queue 60 receives instructions from the instruction cache 34 as inputs, and outputs instructions to both multiplexors 62 and 64. The first multiplexor 62 in turn provides the instructions from either the sequential queue 58 or the target queue 60, to the instruction control unit 16, depending on whether a branch is taken, under the control of the instruction control unit 16. The second multiplexor 64 in turn conditionally provides the instructions from either the sequential queue 58 or the target queue 60, to the sequential queue 58, depending on whether the instructions are issued for execution and a branch is taken, under the control of the instruction control unit 16. Instructions received from the instruction cache 34 are appended to the tail of the sequential or the branch target queues, 58 and 60.

Both the sequential queue 58 and the branch target queue 60 are capable of receiving up to four instructions per clock cycle from the instruction cache 34. The sequential queue, 58, has the capacity to hold up to eight instructions at a time. The branch target queue 60 has the capacity to hold up to four instructions at a time. The sequential and branch target queues, 58 and 60, are also capable of outputting up to three instructions per clock cycle for the instruction control unit 16 through the first multiplexor 62.

While for ease of understanding, the instruction queue 14 has been described with an embodiment capable of providing three sequential and/or branch target instructions per clock cycle to the instruction control unit 16, it will be appreciated that the instruction queue 14 may be extended to provide m instructions per clock cycles to the instruction control unit 16, where m is greater than three, provided the input and output bandwidth and the capacity of queues are adjusted accordingly.

Figure 4:
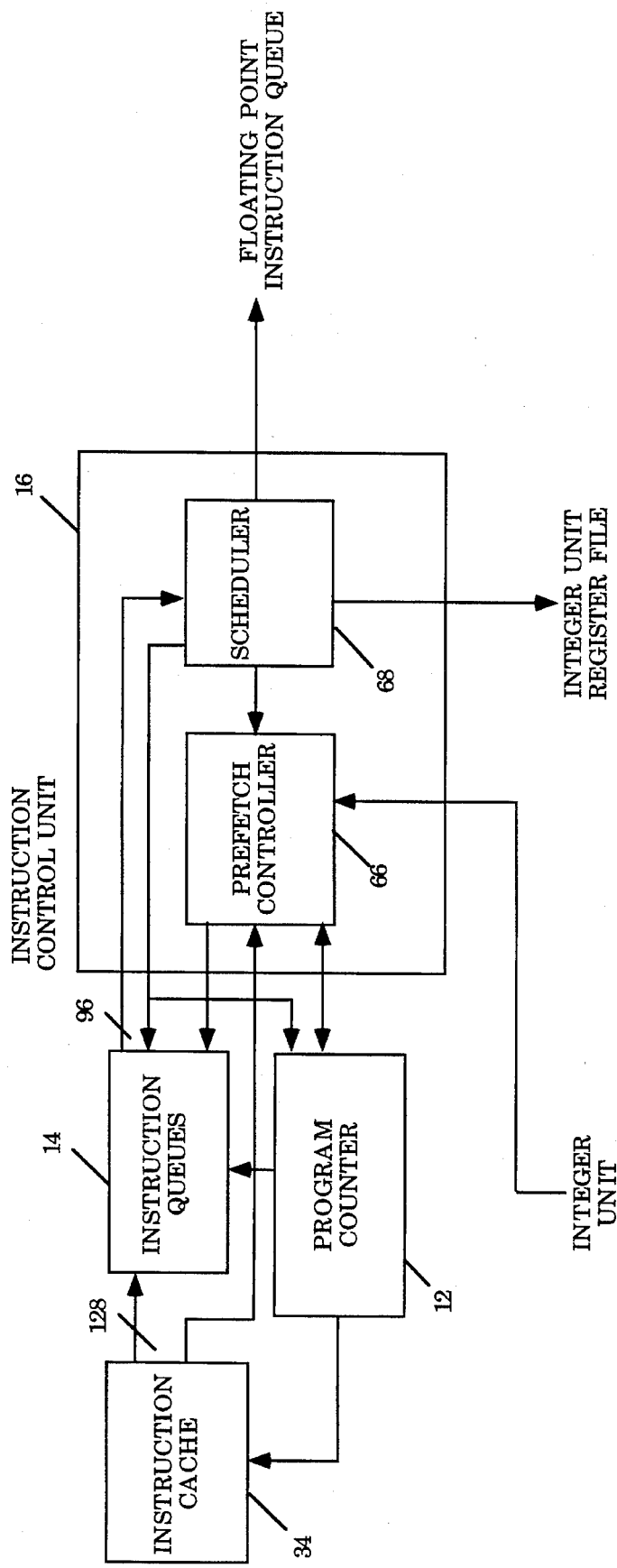
FIG. 4 shows a functional block diagram of the presently preferred embodiment of the instruction control function unit of the present invention incorporated in the pipelined processor of FIG. 1.

Referring now to FIG. 4, a functional block diagrams illustrating the instruction control unit of the exemplary pipelined processor of FIG. 1 is shown. Shown is the instruction control unit 16 comprising a prefetch controller 66 and a scheduler 68. Together, they cooperate to issue up to at most 3 instructions per clock cycle for the integer function unit and/or the floating point instruction queue.

The prefetch controller 66 is coupled to the program counter 12, the instruction queues 14, the instruction cache 34, the scheduler 68, and the integer unit. The scheduler 68 is coupled to the instruction queues 14, the prefetch controller 66, the integer unit register file and the floating point instruction queue.

The prefetch controller 66 performs branch patch prediction and selection, and controls instruction prefetching. The prefetch controller 66 receives branch path resolution from the integer unit, instruction fetch valid bits and unused capacity in the instruction queues from the instruction cache 34, and instruction selection results from the scheduler as inputs, and outputs branch path prediction and resolution to the program counter 12 and control signals to the instruction queues 14. The scheduler 68 receives instructions from the instruction queues 14 as inputs, and outputs register selects and register operands to the integer unit register file and/or floating point instructions to the floating point instruction queue, instruction selection results to the prefetch controller 66, and number of instructions issued in the last cycle to the instruction queues 14 and the program counter 12.

The prefetch controller 66, based on whether a branch is taken, provides control signals to the instruction queues 14, causing the instruction queues 14 to provide three instructions per clock cycle from the head of its sequential or target queue to the scheduler 68. Additionally, the prefetch controller 66, based on whether instructions are issued for execution, conditionally provides control signals to the instruction queues 14, causing the instruction queue to recirculate all or some of the provided instructions from either the sequential or the target queue into the sequential queue. How the prefetch controller 66 predicts and resolves branch paths will be described in further detail with references to FIGS. 10a and 10b.

The scheduler 68 determines whether candidate instructions are issued as part of the current instruction group. The scheduler 68 is capable of receiving up to three instructions from either the sequential or target queue per clock cycle, and outputting up to three instructions for the integer function unit and/or the floating point instruction queue. The scheduler 68 takes less than one clock cycle to determine which of the three instructions, if any, can be issued for execution simultaneously. How the scheduler 68 makes the determination will be described in further detail later with references to FIGS. 6–7.

While for ease of understanding, the instruction control unit 16 has been described with an embodiment capable of providing up to a total of three instructions per clock cycle to the integer function unit and/or the floating point instruction queue, it will be appreciated that the instruction control unit 16 may be extended to provide up to a total of m instructions per clock cycle to the integer function unit and/or the floating point instruction queue, where m is greater than three, provided the input and output bandwidth and scheduler 68 are adjusted accordingly.

Figure 5:
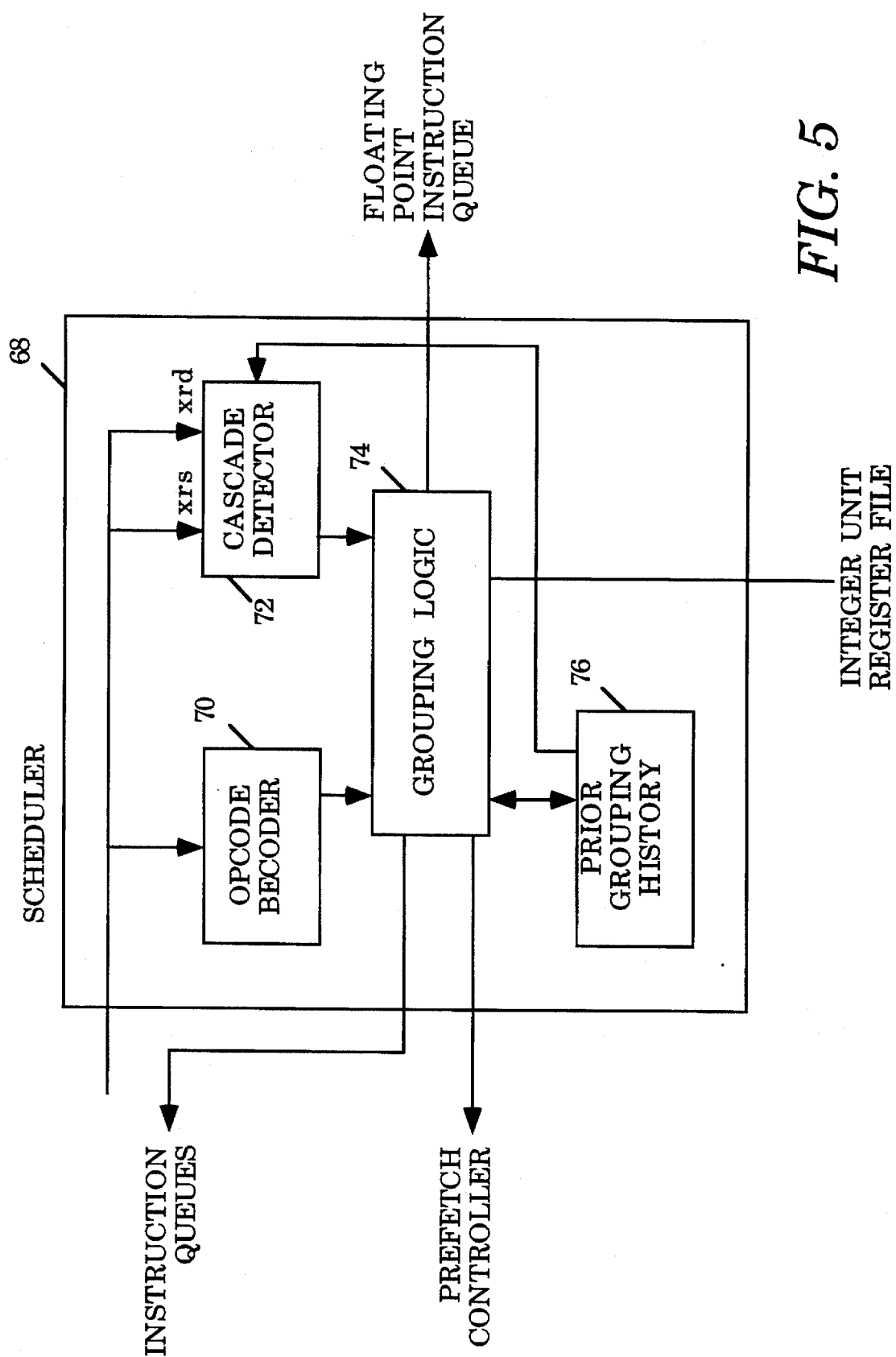
FIG. 5 shows a functional block diagram of the presently preferred embodiment of the scheduler of the instruction control unit of FIG. 4.

Referring now to FIG. 5, a functional block diagram illustrating the scheduler of the instruction control unit of FIG. 4 is shown. Shown is a scheduler 68 comprising an opcode decoder 70, a cascade detector 72, grouping logic 74 and prior grouping history 76. Together, they cooperate to group and issue up to three instructions per clock cycle to the integer function unit and/or the floating point instruction queue for execution.

Both the opcode decoder 70 and the cascade detector 72 are coupled to the instruction queue and the grouping logic 74. The cascade detector 72 is also coupled to the prior grouping history 76. The grouping logic 74 is also coupled to the instruction queue, the prefetch controller, the prior grouping history 76, the integer unit register file, and the floating point instruction queue.

The opcode decoder 70 decodes opcodes of candidate instructions. The opcode decoder 70 receives instruction opcodes from the instruction queues as inputs, and outputs instruction type information for each instruction to the grouping logic 74.

The cascade detector 72 detects data dependencies between candidate instructions themselves and between candidate and predecessor instructions. The cascade detector 72 receives source and destination operand indices from the instruction queues and late arriving integer result indices from the prior grouping history 76 as inputs, and outputs inter-instruction operand dependency information to the grouping logic 74.

The grouping logic 74 determines whether candidate instructions are issued as part of the current instruction group. The grouping logic 74 receives the instruction type and inter-instruction operand dependency information from the opcode decoder 70 and the cascade detector 72 respectively as inputs, and outputs register selects and register operands for the integer unit register file and/or floating point instruction to the floating point instruction queue. Additionally, the grouping logic 74 outputs instruction grouping and issuance results to the prior grouping history 76, the prefetch controller, and the instruction queues.

The prior group history accumulates and maintains instruction grouping and issuance results until the issued instructions exit the pipeline. The prior grouping history 76 receives grouping history updates from the grouping logic 74 as inputs and outputs grouping history to the grouping logic 74 and the cascade detector 72.

The opcode decoder 70, the cascade detector 72 and the grouping logic 74 are all capable of receiving, analyzing and outputting up to three instructions per clock cycle. Similarly, the prior grouping history 76 is also capable of receiving instruction grouping and issuance results for up to three instructions per clock cycle.

Except for the manner in which the opcode decoder 70 cooperates with the instruction queues and the grouping logic 74, the opcode decoder 70 is intended to represent a broad category of opcode decoders found in most pipelined processors. Its basic functions and constitutions are well known and will not be described further. The cascade detector 72 and the grouping logic 74 will be described in further detail later with references to FIGS. 6–7. Except for the manner in which the prior grouping history 76 cooperates with the cascade detector 72 and the grouping logic 74, the prior grouping history 76 is intended to represent a broad category of "scoreboards" found in most pipelined processors. Its basic functions and constitutions are well known and will not be described further.

While for ease of understanding, the scheduler 68 has been described with an embodiment capable of grouping and issuing up to a total of three instructions per clock cycle to the integer function unit and/or the floating point instruction queue, it will be appreciated that the scheduler 68 may be extended to group and issue up to a total of m instructions per clock cycle to the integer function unit and/or the floating point instruction queue, where m is greater than three, provided the input and output bandwidth, the opcode decoder 70, the cascade detector 72, the grouping logic 74 and the prior grouping history 76 are adjusted accordingly.

Figure 6:
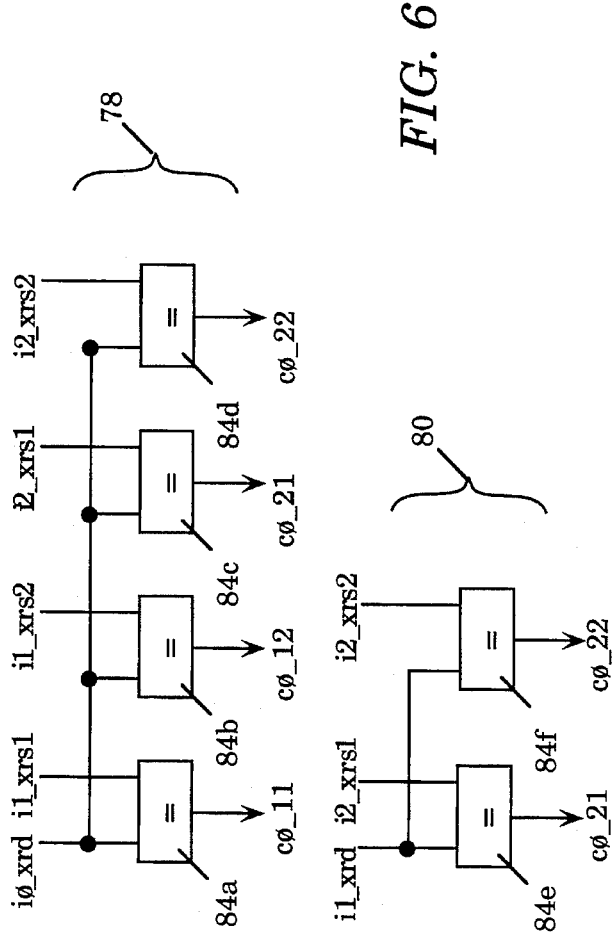
FIG. 6 shows a function block diagram of the presently preferred embodiment of the cascade detector of the scheduler of FIG. 5.
Figure 6:
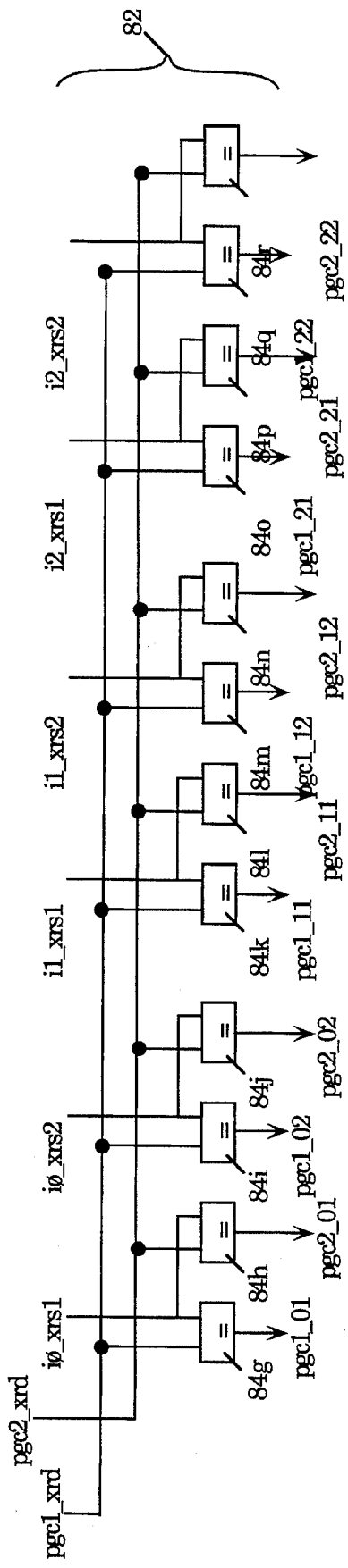

Referring now to FIG. 6, a functional block diagram illustrating the cascade detector of the scheduler of FIG. 5 is shown. Shown is a cascade detector 72 comprising three groups of equality detectors, 78–82. Together, they cooperate to determine data dependencies between the candidate instructions themselves, and between the candidate and predecessor instructions.

Each equality detector, 84a ... , or 84r, is coupled to the instruction queue and the grouping logic of the scheduler. Additionally, each equality detector, 84g, ... , or 84r, of the third group of equality detectors 82 is also coupled to the prior group history of the scheduler.

The first group of equality detectors 78 comprises four equality detectors 84a–84d for detecting data dependencies on the first candidate instruction's result operand by the second and third candidate instruction's source operands. Each equality detector, 84a, 84b, 84c or 84d, of the first group of equality detectors 78 receives the result operand index of the first candidate instruction and one of the four source operand indices of the second and third instructions as inputs. In response, each equality detector, 84a, 84b, 84c or 84d, outputs an indicator indicating whether the inputs equal one another.

The second group of equality detectors 80 comprises two equality detectors 84e–84f for detecting data dependencies on the second candidate instruction's result operand by the third candidate instruction's source operands. Each equality detector, 84e or 84f, of the second group of equality detectors 8receives the result operand index of the second candidate instruction and one of the source operand indices of the third candidate instruction as inputs. In response, each quality detector, 84e or 84f, outputs an indicator indicating whether the inputs equal one another.

The third group of equality detectors 82 comprises twelve equality detectors 84g–84r for detecting data dependencies on either one of the two integer results calculated late in the execution stage of the pipeline by the source operands of the first, second and third candidate instructions. Each equality detector, 84g, ... , or 84r, of the third group of equality detectors 82 receives one of the two prior group integer result indices and one of the six source operand indices of the three candidate instructions as inputs. In response, each equality detector, 84g, ... , or 84r, outputs an indicator indicating whether the inputs equal to one another.

While for ease of understanding the cascade detector 72 has been described with an embodiment capable of detecting data dependencies for three candidate instructions per clock cycle, it will be appreciated that the cascade detector 72 may be extended to detect data dependencies for m candidate instructions per clock cycle, where m is greater than three, provided the number of equality detectors are increased accordingly.

Figure 7:
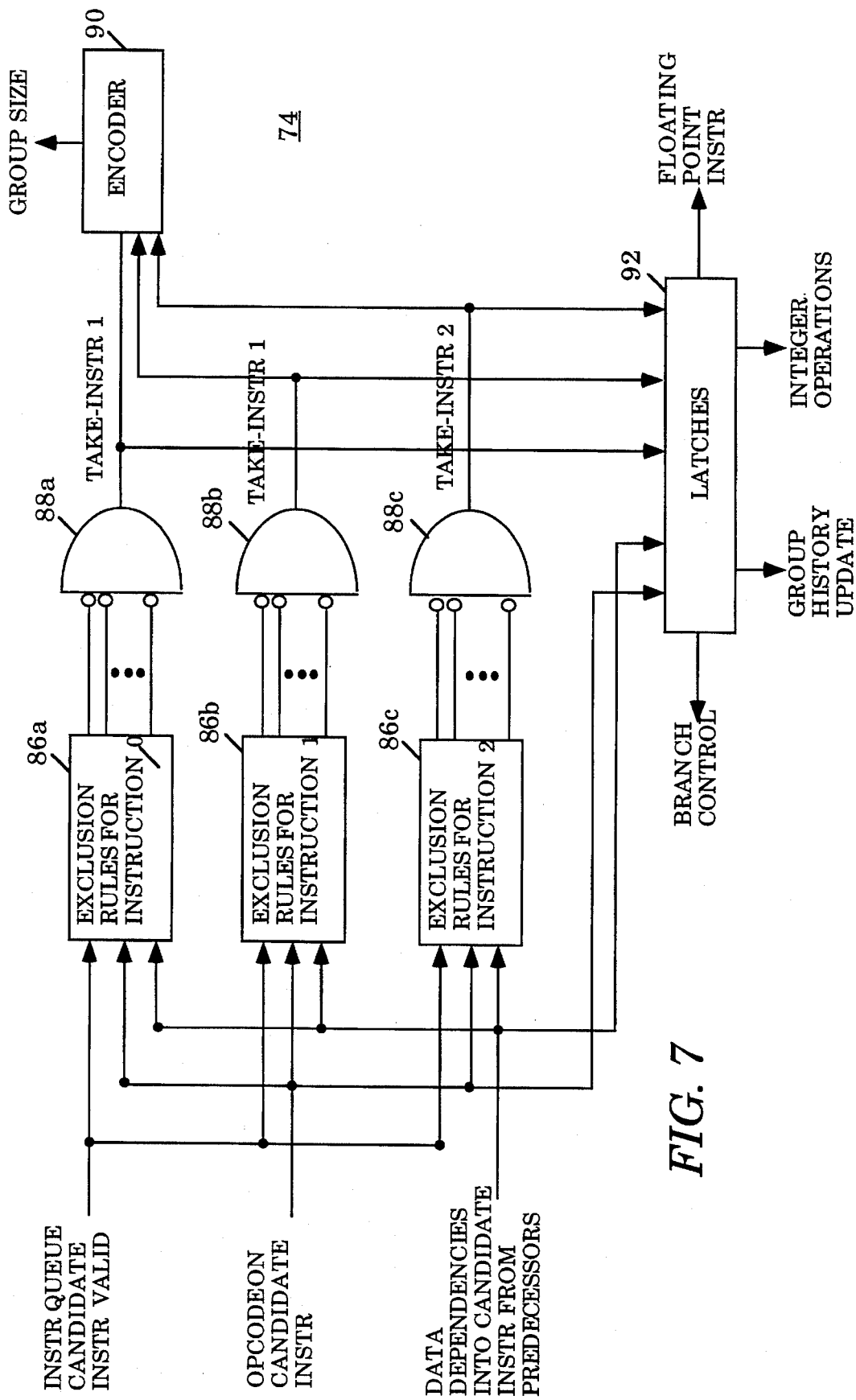
FIG. 7 shows a functional block diagram of the presently preferred embodiment of the grouping logic of the scheduler of FIG. 5.

Referring now to FIG. 7, a functional block diagram illustrating the grouping logic of the scheduler of FIG. 5 is shown. Shown is a grouping logic 74 comprising three exclusion logics 86a–86c and three corresponding AND gates 88a–88c. Additionally, the grouping logic 74 comprises an encoder 90 and a number of latches 92. Together, they cooperate to select in one clock cycle up to three instructions for issuance from three candidate instructions.

The exclusion logics, 86a–86c, and the AND gates, 88a–88c, are coupled to each other correspondingly. The exclusion logics, 86a–86c, are also coupled to the instruction queues, the opcode decoder, the cascade detector, and the prior grouping history. The AND gates, 88a–88c are coupled to the encoder 90 and the latches 92. The encoder 90 is also coupled to the program counters and the instruction queues. The latches 92 are also coupled to the opcode decoder, the cascade detector, the prior-group history, the prefetch controller, the integer unit register files and the floating point instruction queue.

Each exclusion logic, 86a, 86b, or 86c, comprises a number of combinatorial logics implementing a number of exclusion rules that reflect the resource characteristics of the pipelined processor for determining whether a candidate instruction is to be excluded from the current instruction group. Each exclusion logic, 86a, 86b or 86c, receives a candidate instruction valid signal from the instruction queue, an opcode from the opcode decoder and data dependency indicators from the cascade detector as inputs. In response, each exclusion logic, 86a, 86b, or 86c, outputs a number of exclusion signals indicating whether the candidate instruction should be excluded from the current group of instructions to be issued for execution. The exclusion rules will be described in further detail later.

Each AND gate, 88a, 86b or 88c determines whether a candidate instruction is to be included in the current instruction group. Each AND gate, 88a, 88b, or 88c, receives the exclusion signals from the corresponding exclusion logic, 86a, 86b, or 86c, as inputs. In response, each AND gate, 88a, 88b, or 88c, outputs a "take" signal for the candidate instruction indicating whether the candidate instruction is to be included in the current group of instructions to be issued for execution.

The encoder 90 generates the group size for the current instruction group. The encoder 90 receives the "take" signals from the AND gates, 88a–88c, as inputs. In response, the encoder 90 outputs the size of the current group for the program counter and the instruction queues.

The latches 92 generate branch selection, group history update, register selects and operands, and floating point instructions. The latches 92 receive the "take" signals from the AND gates 88a–88c, and the opcodes from the opcode detector, and the data dependencies from the cascade detector as inputs. In response, the latches 92 outputs branch selection for the prefetch controller, group history updates for the prior group history, register selects and operands for the integer unit register file, and floating point instructions for the floating point instruction queue.

The exclusion logics, 86a–86c, and the AND gates 88a–88c, group and issue instructions as follows:

---

Let the three instructions be i0, i1, and i2,
  R0, R1,...Rn, be the exclusion rules,
  Exclude$_i$_Rj to mean that instruction i is to be excluded under exclusion rule j, i = 0, 1, 2, and j = 0, 1, ... n
  Group$_i$_Rj to mean that instruction i can be grouped based on exclusion rule j,
  dGroup$_i$ to mean that instruction i can be grouped disjointly if and only if all instructions that preceded it are also grouped,
  Group$_i$ to mean that instruction i can be grouped,
  ! to mean inversion, and
  && to mean binary union,
then,
  Group0_R0 = !Exclude0_R0,
    . . .
  Group0_Rn = !Exclude0_Rn;
  Group1_R0 = !Exclude1_R0,
    . . .
  Group1_Rn = !Exclude1_Rn;
  Group2_R0 = !Exclude2_R0,
    . . .
  Group2_Rn = !Exclude2_Rn;
  dGroup0 = Group0_R0 && Group0_R1 ... && Group0_Rn,
  dGroup1 = Group1_R0 && Group1_R1 ... && Group1_Rn,
  dGroup2 = Group2_R0 && Group2_R1 ... && Group2_Rn;
  Group0 = dGroup0,
  Group 1 = dGroup0 && dGroup1,
  Group 2 = dGroup0 && dGroup1 && dGroup2.

---

It will be appreciated that any exclusion rule is sufficient to exclude an instruction and any following instructions from being grouped and issued for execution simultaneously.

There are two basic classes of exclusion rules, the "break after" exclusion rules, and the "break before" exclusion rules. The "break after" exclusion rules terminate instruction grouping after the instruction, and the "break before" exclusion rules terminate instruction grouping before the instruction. With each class, the exclusion rules are further subdivided into exclusion rules based on the instructions being analyzed, exclusion rules based on previous groups, and exclusion rules based on exceptions.

The "break after" exclusion rules comprise:

a) Break after first valid exception.

This exclusion rule terminates the current instruction group following any instruction which suffered an instruction access exception during the instruction fetching stage.

b) Break after any control transfer instruction.

This exclusion rule terminates the current instruction group between any branch and the next instruction following the branch. For the exemplary pipelined processor of FIG. 1, a delay instruction always follows a branch instruction.

c) Break after a multiple step (MULSCC) instruction, when its result is not cascaded into an immediately following MULSCC instruction.

This exclusion rule terminates the current instruction group between two consecutive MULSCC instructions when the destination of the first MULSCC instruction is not cascaded into the immediately following second MULSCC instruction. For the exemplary pipelined processor, the MULSCC instruction is used successively 32 times to multiply two 32-bit integers to produce a 64-bit integer product. Each MULSCC execution is dependent on the current state of integer condition codes. Each MULSCC execution produces a single bit of product, and generates new integer condition codes.

d) Break After Condition Codes set in the Cascaded Execution Stage.

This exclusion rule terminates the current instruction group immediately after an instruction which sets the condition codes in the cascaded execution stage. Instructions use the cascaded execution stage when one of their source arguments is generated by a previous instruction in the current instruction group.

e) Break After First Instruction Following Annulled Branch.

This exclusion rule terminates the current instruction group immediately after the first candidate instruction when the prior instruction group (now further down the pipeline) contains an annulled branch. This exclusion rule prevents multiple instructions from executing in the delay slot of an annulled branch. For the exemplary pipelined processor, there are two types of branches, delayed branches and delayed branches with conditional annulment. The latency of computing a branch target and fetching the instruction stream at the target address is mitigated by nominally executing the instruction immediately following each branch. This next instruction is called the branch delay instruction. The delayed branch with conditional annulment will squash the delay instruction if the conditional branch is not taken. The handling of branch instructions will be described in further detail later with references to FIGS. 10a–10b.

f) Break After First Instruction at First Target Address of a Branch Couple.

This exclusion rule terminates the current instruction group after the first instruction at the target of a branch when the processor is midway through processing a branch couple. This exclusion rule prevents multiple instructions from being executed when the first target instruction of branch couple is being issued. For the exemplary pipelined processor, a branch couple is formed when the delay instruction of a branch is another branch.

The "Break Before" exclusion rules comprise:

a) Break Before Invalid Instruction.

This exclusion rule terminates the current instruction group when the instruction control unit is waiting for instructions from the instruction queue. It is possible for the instruction queue to have fewer than three valid instruction. For the exemplary pipelined processor, even instructions fetched during instruction access exceptions are considered valid instructions.

b) Break Before Out of Integer Unit Register File Read Ports:

This exclusion rule terminates the current instruction group before all integer unit register file read ports are used. This exclusion rule prevents a group from using too many integer unit register file read ports.

c) Break Before Second Data Memory Reference.

This exclusion rule terminates the current instruction group before the memory is referenced again for a second time. For the exemplary pipelined processor, there is only one single port to memory. This exclusion rule prevents the single port from being used concurrently by multiple instructions.

d) Break Before Second Floating Point Operation.

This exclusion rule terminates the current instruction group before a second floating point operation is dispatched to the floating point instruction queue. In the exemplary pipelined processor, there is only one port from the instruction control unit to the floating point instruction queue. This exclusion rule prevents the single port from being used concurrently by multiple instructions.

e) Break Before Second Shift.

This exclusion rule terminates the current instruction group before the shifter is used again for a second time. For the exemplary pipelined processor, there is only one shifter. This exclusion rule prevents the shifter from being used concurrently by multiple instructions.

f) Break Before Second Cascade.

This exclusion rule terminates the current instruction group before a second operand is cascaded to a subsequent instruction. This exclusion rule prevents more than one operand being cascaded at one time. A cascade between instructions require two instructions. A second cascade requires either three instructions or a second instruction where both source operands are the results of the first half of the execute stage. The execute stage will be described in further detail later with references to FIGS. 8–9.

g) Break Before Cascade into Shift.

This exclusion rule terminates the current instruction group before an operand is cascaded into an instruction requiring the use of the shifter. This exclusion rule prevents the shifter from being required in the second half of the execute stage. For the exemplary pipelined processor, there is only one shifter, and it has to be used in the first half of the execute stage.

h) Break Before Cascade into Register Relative Control Transfer Instruction (JMPL).

This exclusion rule terminates the current instruction group before an operand is cascaded into a JMPL instruction. This exclusion rule prevents the JMPL instruction from being grouped into an instruction group that will change one of the source registers of the JMPL instruction. For the exemplary pipelined processor, it supports a JMPL instruction, which is a branch instruction whose target address is computed based on the contents of an integer unit register file entry.

i) Break Before Load Data Cascade Use.

This exclusion rule terminates the current instruction group before an instruction that uses the results of a lcad instruction included in the current instruction group. This exclusion rule prevents the results of a lcad instruction from being cascaded into another instruction in the same instruction group. For the exemplary pipelined processor, it takes a full clock cycle to lcad data from memory. Therefore, the data are available only to instructions of a subsequent group and cannot be cascaded to another instruction in the same instruction group.

j) Break Before Cascade Into Memory Reference Address.

This exclusion rule terminates the current instruction group before an instruction that references memory addresses being modified by another instruction included in the current instruction group. This exclusion rule prevents the address of a memory reference from being modified by results cascaded from a preceding instruction in the same instruction group.

k) Break Before Previous Group Cascades Into Memory Reference.

This exclusion rule terminates the current instruction group before a load instruction that uses the results of another load instruction included in the previous instruction group. This exclusion rule prevents two load instructions to be included in two consecutive group (the "Break Before Second Load" and "Break Before Load Use" exclusion rules prevent two consecutive loads to be included in the same instruction group). For the exemplary pipelined processor, data in memory are referenced in the execute stage. Addresses for a memory reference are computed in the prior cycle by reading the memory address register ports one half cycle before beginning the memory reference. As a result, address registers may be added with immediate data to generate a load store address by the start of the execute stage. Forwarding paths are provided to forward the computed addresses to the load store address adder.

l) Break Before Sequential Instruction.

This exclusion rule terminates the current instruction group before an instruction that is a member of a special group of instructions which can be executed by themselves only. This exclusion rule prevents these special instructions from being grouped in the same instruction group. For the exemplary pipelined processor, these special instructions comprise instructions that access to control registers, instructions that access to I/O ports, instructions that perform integer multiply and divide, floating point branch instructions, atomic memory references used to update semaphores, pipeline flush and cache invalidate instructions, and any instruction which modifies the current register window pointer.

m) Break Before Control Register Read After Previous Group Sets Integer Condition Code (SetCC).

This exclusion rule terminates the current instruction group before including an instruction that reads a control register in the process of being modified by a preceding instruction. This exclusion rule prevents the control register being read by an instruction when the control register is being modified by a preceding instruction in the same instruction group. For the exemplary pipelined processor, integer condition codes are generated by the integer unit.

n) Break Before Second SetCC Unless Two Adjacent MULSCCs.

This exclusion rule terminates the current instruction group before a Second SetCC instruction, unless the first two candidate instructions are MULSCCs. It also terminates groups of MULSCC pairs after the second candidate instruction. This reduces complexity in restricting the potential sources for condition code setting with the integer function unit. For the exemplary pipelined processor, MULSCC instructions are either executed in single instruction group or in two instruction group with another MULSCC instruction.

o) Break Before Extended Arithmetic When Current Group SetCC.

This exclusion rule terminates the current instruction group before an extended arithmetic instruction that follows an included instruction which sets the integer condition codes. This exclusion rule prevents the integer condition codes of the extended arithmetic instruction from being modified. For the exemplary pipelined processor instruction, multiple passes are made through the integer unit during the execution stage. The first pass is a conventional arithmetic instruction which modifies the condition codes for subsequent iterations. The subsequent passes use "extended" arithmetic instructions which use the integer condition codes as an additional source argument.

p) Break Before A Branch in the Delay Instruction Group Unless the Branch is the Delay Instruction Itself.

This exclusion rule terminates the current instruction group before a branch instruction that follows an included delay instruction. This exclusion rule prevents additional branches from being initiated in the delay instruction unless the delay instruction itself is a branch.

q) Break Before Branch in JMPL Delay Slot Unless Branch is a Register Relative Branch.

This exclusion rule terminates the current instruction group before a branch instruction in a delayed slot of a register relative branch, unless the branch instruction is also a register relative branch. This exclusion rule reduces design complexity for branch target address selection to instruction cache.

r) Break Before First Instruction When Pipeline Stalls.

This exclusion rule terminates the current instruction group when the pipeline is stalled. This exclusion rule prevents instructions from entering the pipeline, when it is stalled. For the exemplary pipelined processor, the pipeline may be stalled by data cache misses and floating point queue full conditions.

Figure 8:
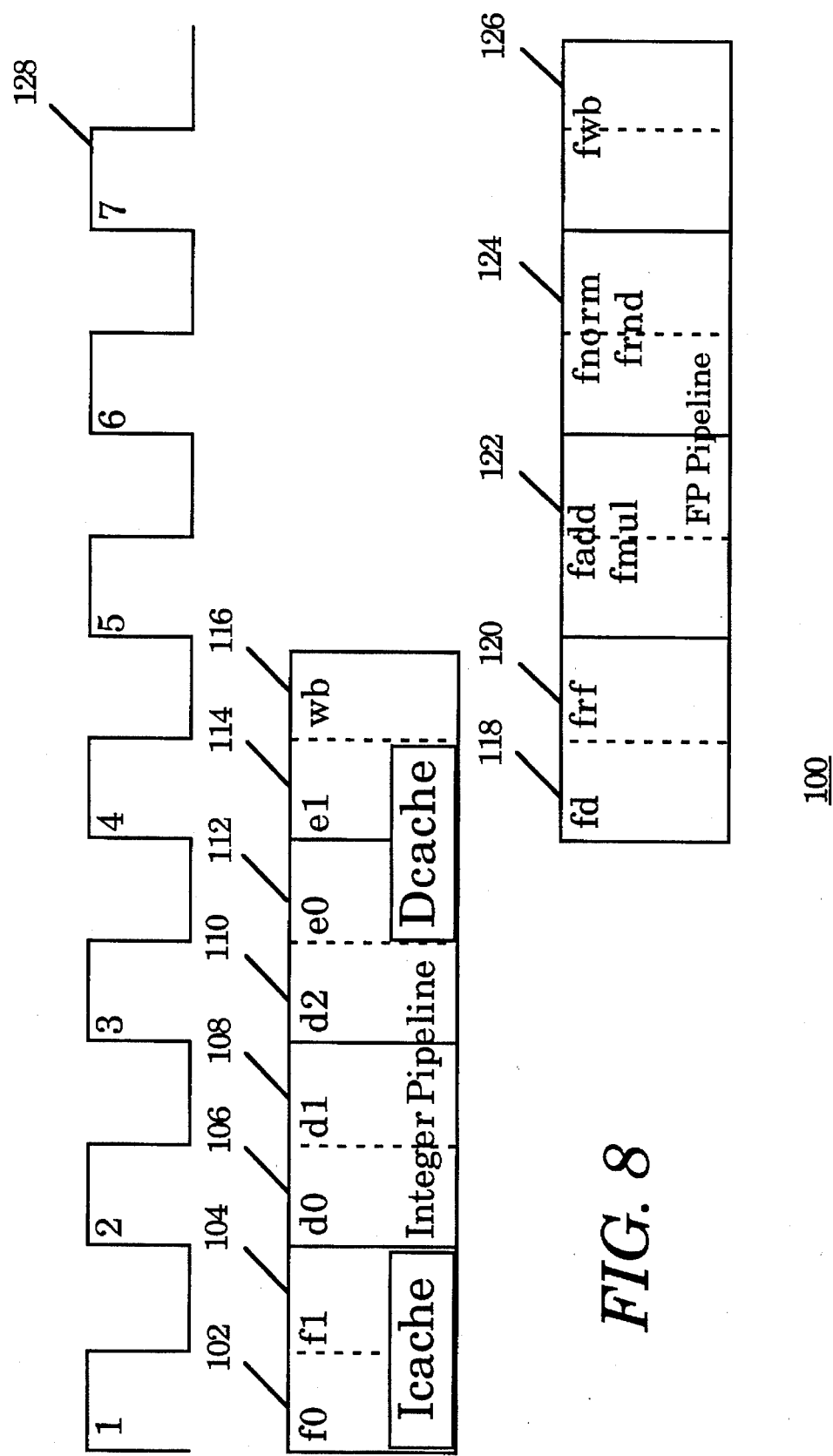
FIG. 8 illustrates the presently preferred embodiment of the pipeline stages of the pipelined processor of FIG. 1.

Referring now to FIG. 8, a block diagram illustrating the presently preferred embodiment of the pipeline stages of the present invention incorporated in the pipelined processor of FIG. 1 is shown. Shown is the presently preferred embodiment of the pipeline stages of the present invention 100 comprising a plurality of integer pipeline stages 102–116, and a plurality of floating point pipeline stages 118–126. Also shown is a series of clock pulses 128 comprising seven clock cycles.

The integer pipeline stages 102–116 comprise two instruction fetching stages (f0 and f1), 102 and 104, three instruction decoding stages (d0, d1 and d2), 106–110, two execution stages (e0 and e1), 112 and 114, and one write back stage (wb) 116. The floating point pipeline stages 118–126 comprise two instruction decoding stages (fd and frf), 118 and 120, two execution stages (fadd/fmul and fnorm/frnd), 122 and 124, and one write back stage 126. Except the floating point execution stages (fadd/fmul and fnorm/frnd), 122 and 124, each pipeline stage, 102, ... 120, or 126, takes half a clock cycle. Each floating point execution stage (fadd/fmul or fnorm/frnd), 122 or 124, takes one clock cycle.

It will be appreciated that the present invention may be practiced without some of these exclusion rules or with additional exclusion rules depending on the particular implementation of the pipelined processor.

Figure 9:
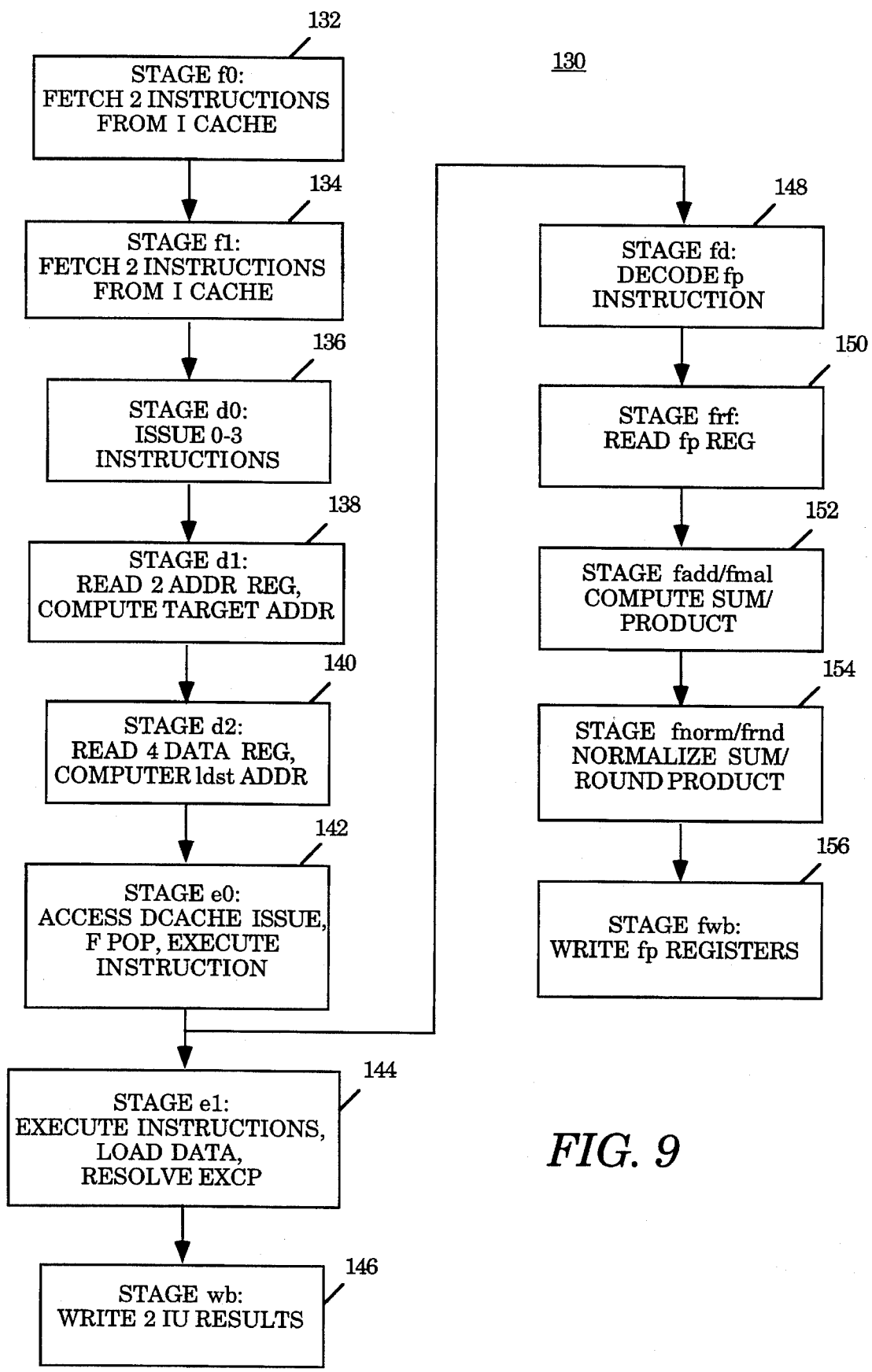
FIG. 9 shows a flow diagram illustrating the operating flow of the pipeline of FIG. 8.

Referring now to FIG. 9, a block diagram illustrating the operational flow at the various pipeline stages of the pipeline of FIG. 8 is shown. At stages f0 and f1, four instructions are fetched from the instruction cache, two instructions per stage, blocks 132 and 134.

At stage d0, up to three instructions are simultaneously issued to the integer function unit and/or the floating point queue for execution, block 136. At stage d1, two address registers in the integer unit register file are read, and the target address of a branch instruction is computed, block 138. At stage d2, four data registers in the integer unit register file are read, and the load/store address of a load/store instruction is computed, block 140.

At stage e0, the data cache is accessed, the floating point operations are issued, and the first instruction in the integer unit is executed, block 142. At stage e1, the second instruction in the integer unit is executed, data are loaded from the data cache/memory, and exception conditions are resolved, block 144. At stage wb, two integer results are written to the data cache/memory or the integer unit register file, block 146.

At stage fd, the floating instruction is decoded, block 148. At stage frf, the floating point register file is read, block 150. At stage fadd/fmul, either a floating point sum or a floating product is completed, block 152. At stage fnorm/frnd, either the floating point sum is normalized or the floating point product is rounded, block 154. At stage fwb, the floating point result is written back into the floating point register file, block 156.

Figure 10A:
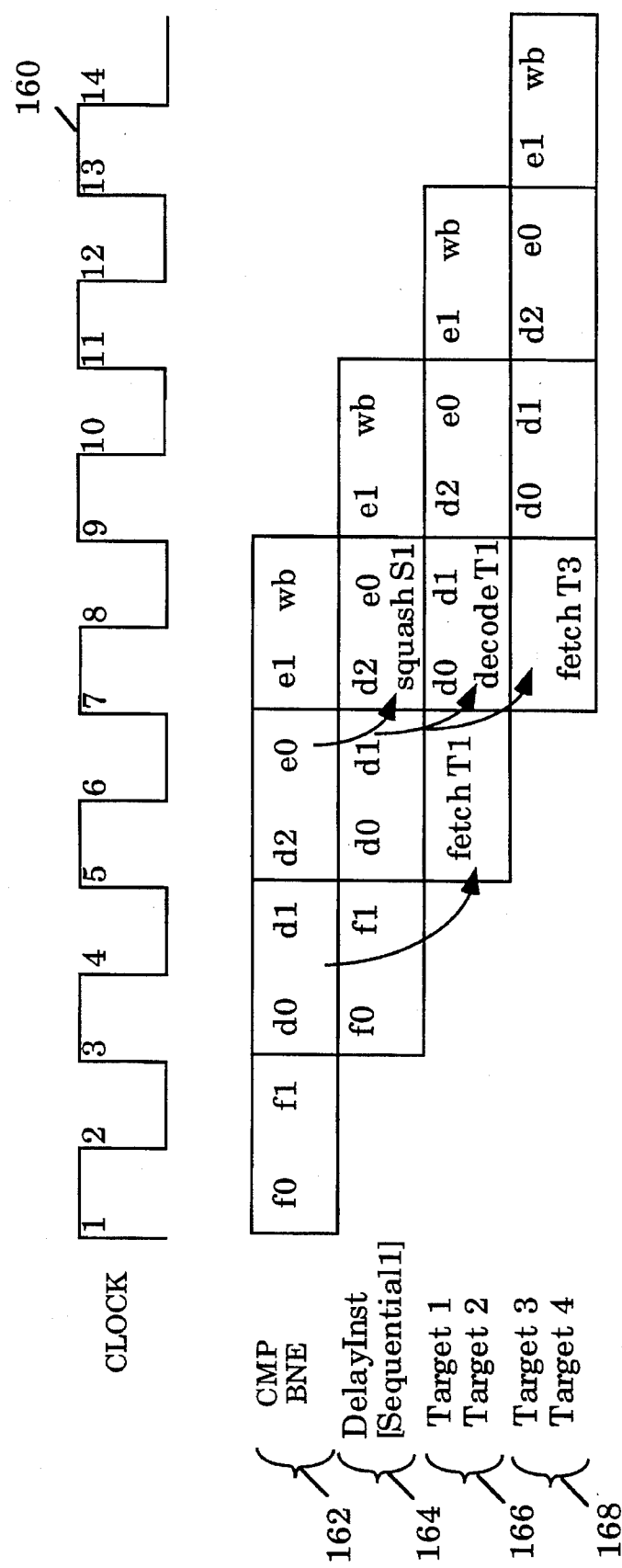
FIGS. 10a–10b illustrate the handling of branch instructions by the instruction control function unit of FIG. 4.
Figure 10B:
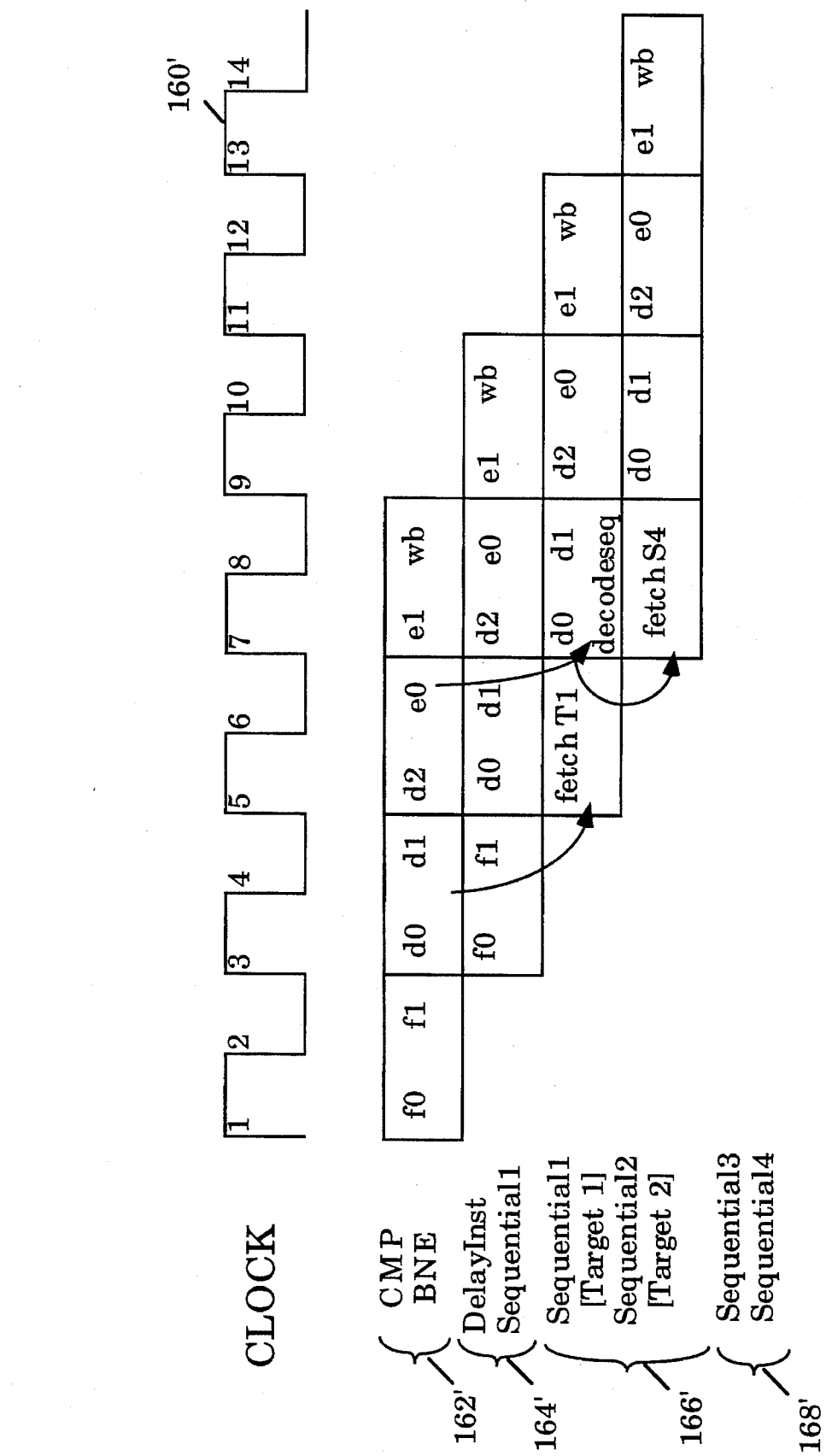

Referring now to FIGS. 10a and 10b, two block diagrams illustrating the handling of branch instructions for the pipeline of FIG. 9 is shown. FIG. 10a illustrates the case when a branch is taken. FIG. 10b illustrates the case when a branch is not taken.

Shown in FIG. 10a are four exemplary instruction groups, 162–168, moving through the integer pipeline. At time 3, the instruction control unit issues the first exemplary two instruction group comprising a compare instruction (CMP) and a branch on not equal instruction (BNE) to the integer function unit for execution. The instruction control unit detects the branch instruction in the course of forming the instruction group. The prefetch controller assumes the branch is going to be taken, and waits until the delay instruction is present in the sequential instruction queue before fetching the target instruction streams.

At time 5, the instruction control unit issues the second exemplary two instruction group comprising the fetched Delay instruction and the next sequential instruction to the integer function unit for execution. At the same time, the instruction control unit causes the first and second target instructions to be fetched into the target instruction queue.

At time 6, the branch is resolved by the integer function unit with the branch being taken and the program counter updated accordingly. So, at time 7, the instruction control unit squashes the first sequential instruction and the prefetch controller moves content of the target instruction queue to the sequential instruction queue. The instruction control unit squashes the first sequential instruction by raising an exception causing the program counter to be updated accordingly. At the same time, the instruction control unit moves the third exemplary two instruction group comprising the first and second target instructions to the opcode decoder and cascade detector for instruction decoding and data dependency detection. Furthermore, the instruction control unit causes the third and fourth target instructions to be fetched into the target instruction queue.

Shown in FIG. 10b are four exemplary instruction groups, 162'–168', moving through the integer pipeline. At time 3, the instruction control unit issues the first exemplary two instruction group comprising a compare instruction (CMP) and a branch on not equal instruction (BNE) to the integer function unit for execution. The instruction control unit detects the branch instruction in the course of forming the instruction group. The instruction control unit assumes the branch is going to be taken, and waits until the delay instruction is present in the sequential instruction queue before fetching the target instruction stream.

At time 5, the instruction control unit issues the second exemplary two instruction group comprising the fetched Delay instruction and the next sequential instruction to the integer function unit for execution. At the same time, the instruction control unit causes the first and second target instructions to be fetched into the target instruction queue.

At time 6, the branch is resolved by the integer function unit with the branch not being taken and the program counter updated accordingly. So, at time 7, the instruction control unit lets the first sequential instruction continue to move down the integer pipeline by not raising an exception to squash the first sequential instruction, and the prefetch controller discards the fetched first and second target instructions. At the same time, the instruction control unit moves the third exemplary two instruction group comprising the second and third sequential instructions to the opcode decoder and cascade detector for instruction decoding and data dependency detection. Furthermore, the instruction control unit causes the fourth and fifth sequential instructions to be fetched into the sequential instruction queue.

It will be appreciated that exception handling may be implemented in a variety of well known manners. Preferably, a precise exception mechanism is employed. For further description of a precise exception mechanism, see U.S. patent application Ser. No. 07/875,963, filed on Apr. 29, 1992 and now abandoned, entitled Precise Exception Mechanism for a Super-Scalar Computer, and assigned to the same assignee of the present invention, Sun Microsystems, Inc., Mountain View, Calif.

Referring now to FIG. 11, a diagram illustrating the execution of an exemplary application on the exemplary pipelined processor of FIG. 1 is shown. Shown is the LINPACK Daxpy_4 program 170 with the equation $A(i)=N \times B(j)+C(k)$, unrolled four times. A total of 27 instructions has to be executed to produce the results. The instruction control unit of the exemplary pipelined processor issues the 27 instructions in 12 instruction groups, 172–194, each group, 172, . . . or 192, comprising up to three instructions, for overlapping execution. As a result, the 27 instructions can be executed in 12 clock cycles leading to an improved throughput of 2.25 instruction per cycle.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a pipelined processor comprising an instruction control unit, a method for queuing and requeuing instructions for said instruction control unit, said method comprising the steps of:
   a) queuing a plurality of sequential instructions in a sequential instruction queue;
   b) queuing a plurality of branch target instructions in a branch target instruction queue;
   c) providing selected ones of said sequential and branch target instructions from said sequential and target instruction queues to said instruction control unit; and
   d) requeuing said instructions provided to said instruction control unit into said sequential queue if said provided instructions are not issued for execution by said instruction control unit.

2. The method as set forth in claim 1, wherein, said sequential and target instructions are queued into said sequential and target queues respectively at a rate of four instructions per clock cycle.

3. The method as set forth in claim 1, wherein, said instructions are provided to said instruction control unit from said sequential and branch target instruction queues at a rate of three instructions per clock cycle.

4. In a pipelined processor comprising an integer and a floating point function unit, a method grouping and issuing multiple instructions simultaneously to said integer and floating point units for execution, said method comprising the steps of:
   a) receiving m instructions from an instruction queue;
   b) decoding opcodes of said m instructions;
   c) detecting operands used in other instructions that cascade from one instruction to another;
   d) applying a plurality of exclusion rules to each of said m instructions to determine whether said instruction is to be excluded from issuance to said integer and floating point units for execution in conjunction with the other instructions;
   e) groundling said instructions that are not excluded and issuing them simultaneously to said integer and floating point units for execution; and
   f) tracking history of said issued instruction group, said history being used when detecting cascading operands in said step c) and applying said exclusion rules in said step d).

5. The method as set forth in claim 4, wherein,
   m equals three;
   said three instructions are received from said instruction queue at a rate of three instructions per clock cycle;
   said steps b), c), d), e) and f) are performed within one clock cycle.

6. The method as set forth in claim 4, wherein, said exclusion rules comprise a plurality of "Break After" and a plurality of "Break Before" exclusion rules, said "Break After" exclusion rules terminate instruction grouping after the instruction being considered based on relationships among preceding instructions, and said "Break Before" exclusion rules terminate instruction group before the instruction being considered based on the usage of hardware resources available to said pipelined processor.

7. In a pipelined processor comprising an instruction control unit, an apparatus for queuing and requeuing instructions for said instruction control unit comprising:

a) first queuing means for queuing a plurality of sequential instructions;

b) second queuing means for queuing a plurality of branch target instructions;

c) first multiplexor means coupled to said first and second queuing means and said instruction control unit for providing selected ones of said sequential and branch target instructions to said instruction control unit; and d) second multiplexor means coupled to said first and second queuing means and said instruction control unit for requeuing said instructions provided to said instruction control unit into said sequential queue if said provided instructions are not issued for execution by said instruction control unit.

8. The apparatus as set forth in claim 7, wherein, said first and second queuing means queue said sequential and target instructions respectively at a rate of four instructions per clock cycle.

9. The apparatus as set forth in claim 7, wherein, said first multiplexor means provides said instructions to said instruction control unit at a rate of three instructions per clock cycle.

10. In a pipelined processor comprising an integer and a floating point %unction unit, an apparatus for grouping and issuing multiple instructions simultaneously to said integer and floating point units for execution comprising:

a) receiving means for receiving m instructions from an instruction queue;

b) decoding means coupled to said receiving means for decoding opcodes of said m instructions;

c) detecting means coupled to said receiving means for detecting operands used in other instructions that cascade from one instruction to another;

d) grouping means coupled to said decoding and detecting means for applying a plurality of exclusion rules to each of said m instructions to determine whether said instruction is to be excluded from issuance to said integer and floating point units for execution in conjunction with the other instructions, grouping said instructions that are not excluded, and issuing them simultaneously to said integer and floating point units for execution; and e) tracking means coupled to said detecting and grouping means for tracking history of said issued instruction group, said history being used by said detecting means and said grouping means when detecting cascading operands and applying the exclusion rules respectively.

11. The apparatus as set forth in claim 10, wherein, m equals three;

said receiving means receives said three instructions from said instruction queue at a rate of three instructions per clock cycle;

said decoding, detecting, grouping and tracking means perform their operations within one clock cycle.

12. The apparatus as set forth in claim 10, wherein, said exclusion rules comprise a plurality of "Break After" and a plurality of "Break Before" exclusion rules, said "Break After" exclusion rules terminate instruction grouping after the instruction being considered based on relationships among preceding instructions, and said "Break Before" exclusion rules terminate instruction grouping before the instruction being considered based on the usage of hardware resources available to said pipelined processor.

* * * * *

UNITED STATES PATENT AND TRADEMARK OFFICE
CERTIFICATE OF CORRECTION

PATENT NO. : 5,509,130
DATED : April 16, 1996
INVENTOR(S) : Trauben et al.

It is certified that error appears in the above-identified patent and that said Letters Patent is hereby corrected as shown below:

In column 21, claim 10 at line 24, please delete "%unction " and insert
-- function --.

Signed and Sealed this

Second Day of March, 1999

Attest:

Q. TODD DICKINSON

*Attesting Officer*   *Acting Commissioner of Patents and Trademarks*